United States Patent [19]

Bennett et al.

[11] Patent Number: 4,707,928

[45] Date of Patent: Nov. 24, 1987

[54] VARI-SCALE

[76] Inventors: Roy L. Bennett, 146 Ange Dr., Pittsburgh, Pa. 15235; James A. Cianciosi, 5403 Black St., Pittsburgh, Pa. 15206; William U. Clark, 5424 Fifth Ave., Pittsburgh, Pa. 15232

[21] Appl. No.: 769,257

[22] Filed: Nov. 19, 1985

[51] Int. Cl.[4] .................................................. G01B 3/02

[52] U.S. Cl. ........................................ 33/491; 33/488; 33/494

[58] Field of Search ................. 33/491, 483, 488, 494, 33/484

[56] References Cited

U.S. PATENT DOCUMENTS

| | | | |
|---|---|---|---|
| 418,968 | 1/1890 | Benzinger, et al. | 33/463 |
| 2,124,550 | 7/1938 | Evans | 33/491 |
| 2,156,524 | 5/1939 | Christensen | 33/491 |
| 2,322,248 | 6/1943 | Miller | 33/491 |
| 2,353,799 | 7/1944 | Ward | 33/491 |
| 2,375,150 | 5/1945 | Townsend | 33/491 |

FOREIGN PATENT DOCUMENTS

| | | | |
|---|---|---|---|
| 1917768 | 10/1970 | Fed. Rep. of Germany | 33/491 |
| 83720 | 1/1957 | Netherlands | 33/491 |

*Primary Examiner*—Willis Little

[57] ABSTRACT

This invention relates to a graduated engineer/architect rule having variably selectable scales for measuring distances and establishing linear proportionalities for representation on a technical drawing. The rule comprises an enclosed, continuous fabric sheet bearing a plurality of divided scales of both the engineer and architect type. The sheet is mounted on and carried by idler rollers, guide platens, and a full length drive platen. A specific scale may be selected by rotating a scale adjustment knob to rotate the drive platen and advance the sheet adjacent to a full length viewing window.

2 Claims, 7 Drawing Figures

VARI-SCALE

BACKGROUND OF THE INVENTION

This invention relates to the graduated rule commonly used by draftsmen, engineers and architects to lay off, or measure distances and to establish linear proportionalities for representation on a technical drawing.

Currently in widespread use are instruments which contain either the standard series of architect's scales, the engineer's scales or special scales such as metric. A disadvantage of these devices is that two or more separate units are required for most applications. An additional disadvantage is that these devices have the graduations unprotected and subject to direct contact with both drafting instruments and the working surface of the drawing, which can cause the abrading away of the graduations. Furthermore, the user must physically select the desired scale and maintain its proper orientation to the working surface at all times. Thus, a substantial likelihood exists for inadvertantly using the incorrect scale. Also, the abrading away of graduations and numerals shortens the useable life of these devices.

It is the object of this invention to provide a measuring-scale instruments which overcomes the disadvantages of scales currently in use and which offers distinct efficiencies to the user-technician.

SUMMARY OF THE INVENTION

The objective is achieved according to the invention by providing a device which contains all seventeen fully divided scales of both the engineer and the architect type. Thus, one instrument replaces the two traditional devices. It is composed of a fully enclosed fabric sheet (14) bearing all of the printed graduations and numerical information for the seventeen scales. A full length drive platen (9) and scale adjustment knob (6) allows a specific scale to be selected and rotated into working position. A full length viewing window (3) along the lower corner of the trapezoidal prism shaped housing (1) permits the selected scale to be brought to the working surface. No other scales are simultaneously visible, thus eliminating any possibility of reading from an incorrect scale.

The graduated fabric sheet (14) is mounted on and carried by idler rollers (12), guide platens (13) and a drive platen (9) which are mounted in a manner that assures clear viewing and minimizes parallax. The graduated sheet (14) is maintained taut and free of twisting or creases by the spring-loaded mounting of the drive platen (9). Since the fully graduated sheet (14) is enclosed in a housing (1), such as abrasion resistant acrylic plastic, wear is minimized. Also, since the trapezoidal housing end plate (4) is removable, the fabric sheet (14) and mountings can be removed for cleaning of the plastic housing (1) or to enable the replacement of the metallic fiber graduated sheet (14). Also, replacement could be useful when a special series of scales is required, such as metric, or those having extremely large, or small conversion ratios. This option permits an unlimited number of scales to be incorporated in this single device, while only the specific scale required appears in the working position. A particularly useful replacement fabric sheet would be one which allows a direct conversion between the English unit scales and their metric equivalent. This would be achieved by juxtaposing the set of two scales for each selected ratio displayed in the scale-type indication window.

The major components of this invention, their interaction and function are described herein with reference to the accompanying drawings.

DETAILED DESCRIPTION OF THE INVENTION

Figure 1:
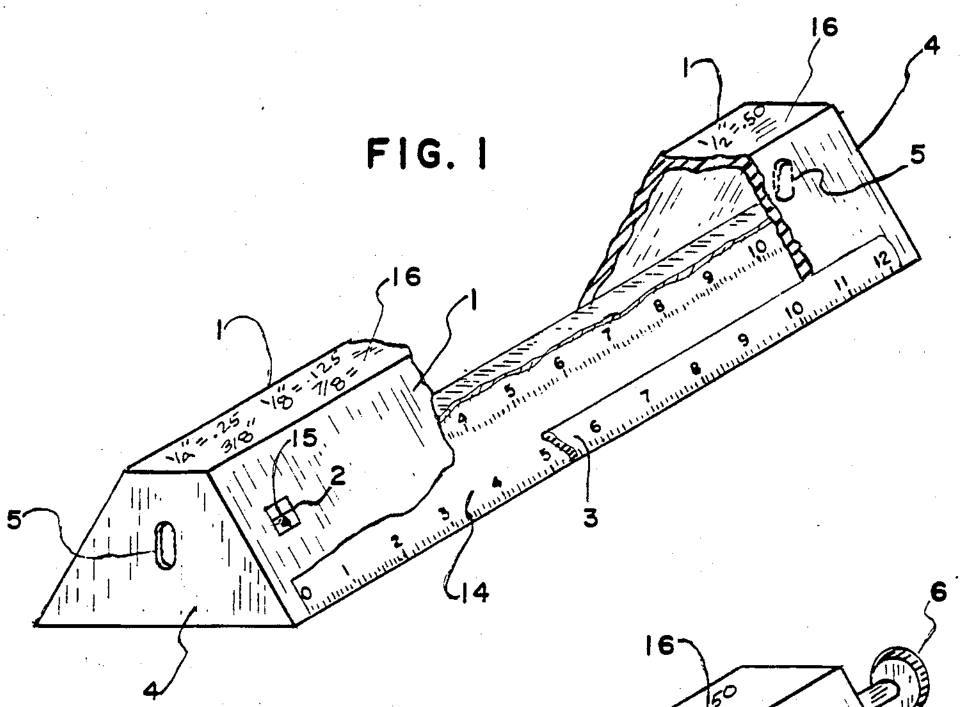
FIG. 1 is an isometric, cutaway view of the outer housing (1), scale graduations viewing window (3) and the frabric sheet (14).

FIG. 1 presents an isometric, cutaway view of the entire instrument. For the purpose of this explanation, the rectangular sloping surface containing the scale graduations viewing window (3), and the scale type indication window (2) is to be considered the front of the instrument. The opposite face will be referred to as the rear of the instrument. With that reference, the left and right end plates (4) can be identified. The scale is made up of a acrylic plastic housing (1), having a nearly trapezoidal cross section, approximately $12\frac{3}{4}$ inches in length, a base width of $2\frac{1}{8}$ inches, two sloping sides, $1\frac{5}{8}$ inches high and a top surface, $\frac{5}{8}$ inches wide. The dimensions are nearly identical to those for the traditional scales now in use.

When in use, the device is intended to be oriented with the $2\frac{1}{8}$ inch wide base resting on the working surface. A transparent, plastic, scale graduations viewing window (3) is located at the lower edge of the front sloping surface contiguous with the base beginning $\frac{5}{8}$ inches from the end and extending along the entire length of the scale. This full length window provides a low magnification capability permitting the user to effectively read the scale graduations and align them with the work. Since this viewing window (3) is the only location on the instrument at which the selected working scale can be viewed, no opportunity exists for reading an incorrect scale. One additional viewing window, the scale type indicating window (2), approximately $\frac{1}{2}$ inch long by $\frac{3}{8}$ inch high, appears on the front surface near the left end of the instrument, 13/16 inches above the working surface, i.e. centered vertically on the sloping side surface. This viewing window (2) continuously displays the scale designation selected by the user allowing rapid scale selection and verification. These viewing windows are to be made of clear acrylic plastic sheet and fitted into the openings in the plastic housing (1) of the instrument using a solvent type cement.

Figure 2:
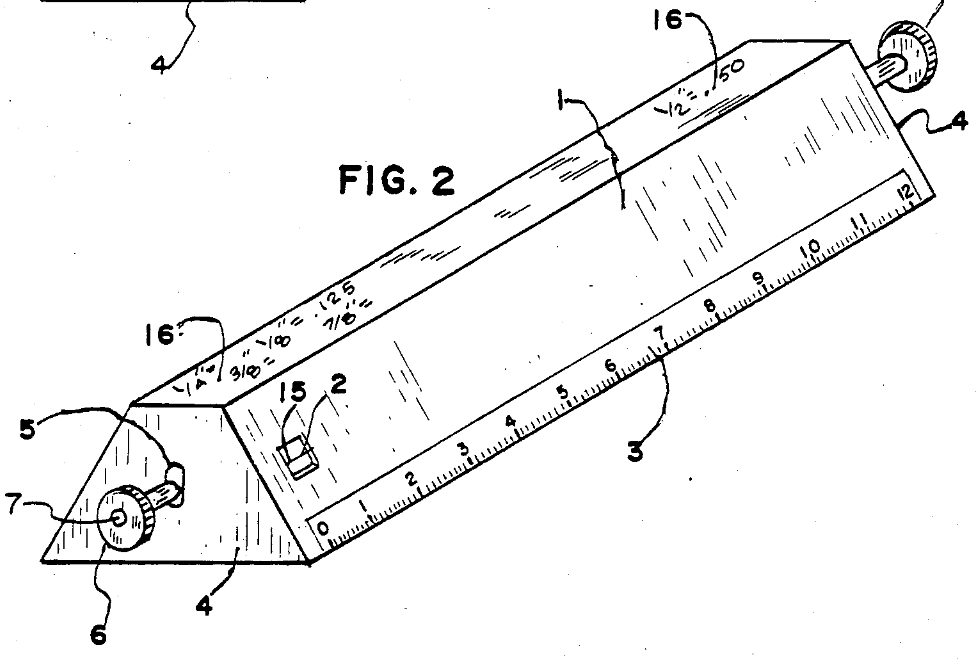
FIG. 2 is an isometric view showing the outer housing (1) of the unit, the working edge, scale type indicator window (2) and adjustment knob (6).
Figure 4:
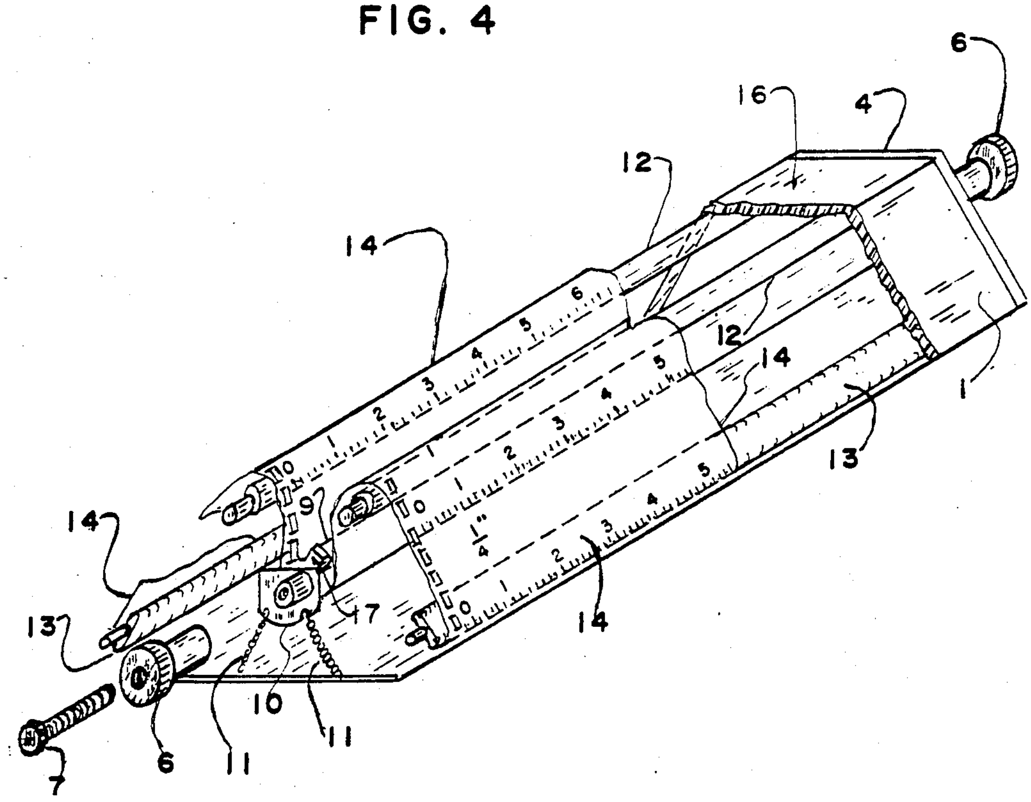
FIG. 4 is an isometric, cutaway view showing the internal mechanism including the drive platen (9) as it carries the graduated fabric sheet (14).
Figure 5:
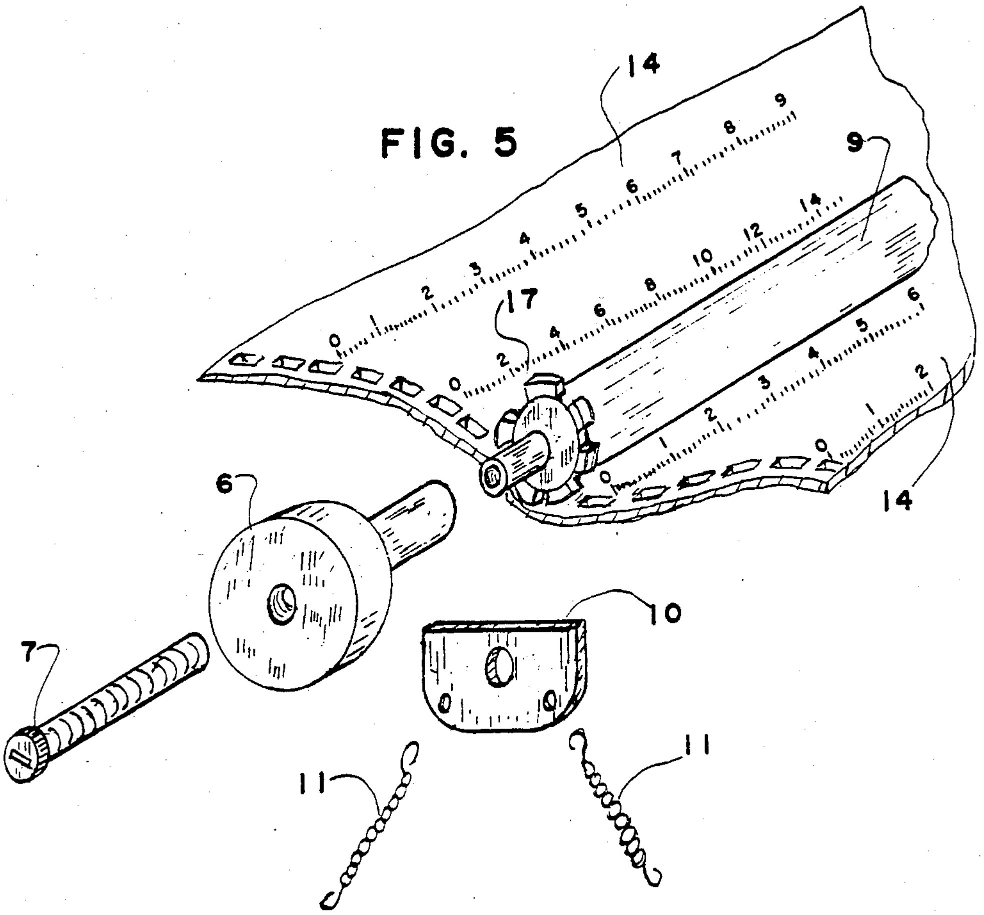
FIG. 5 is a detail view showing the drive platen (9), tensioning end plates (4) and graduated fabric sheet (14).

The back surface of the scale as well as the top surface (16) of the housing (1) above the base are available for the display of revelant engineering or design data such as conversion tables or mathematical formulae as well as instructions for the operation of the instrument itself. The two trapezoidal housing end plates (4), are fitted to the main body of the instrument using friction fit, half lap joints. The left and right housing end plates (4) are identical and are retained by the scale adjustment knobs (6), shown on FIGS. 2 and 3. The bearing surface of the knob (6) presses on the raised bearing surface (5) surrounding the slotted hole in the end plate (4) of FIGS. 1 and 2, providing axial compression. The scale adjustment knobs (6) are retained and brought into bearing by slotted locking machine screws (7), FIGS. 3, 4 and 5. This locking screw (7) passes through the hole in the center of the knob (6). This machine screw (7) advances along the internally threaded end of the drive platen (9), FIGS. 3, 4 and 5. By advancing on this tapped hole in the end of the drive platen (9), the locking screw (7) presses the knob (6) against the bearing face (5) of the housing end plate (4) assuring a firm snug fit of all housing components and the internal end frame (8). This compression stacks the housing end plate (4), the end frame (8) which supports the idler rollers (12) and guide platens (13). The right end plate (4) has a similar assembly with a single exception. The machine locking screw (7) is provided with a locking washer (18). Thus, the screw (97) is mated and locked to the drive platen (9) at the right end, permitting the scale adjustment knob (6) on the right end to remain functional yet prohibiting tension and alignment of the drive platen (9) to be performed from the right end. This arrangement assures equal advancement of the two locking screws (7) and thereby centering the drive platen (9) between the end plate (4). By removing the two end locking screws (7) from the two scale adjustment knobs (6), the housing end plates (4) and end frames (8) can be removed. This will then permit removal of the drive platen (9) and the entire internal operating mechanism from the housing (1).

Figure 3:
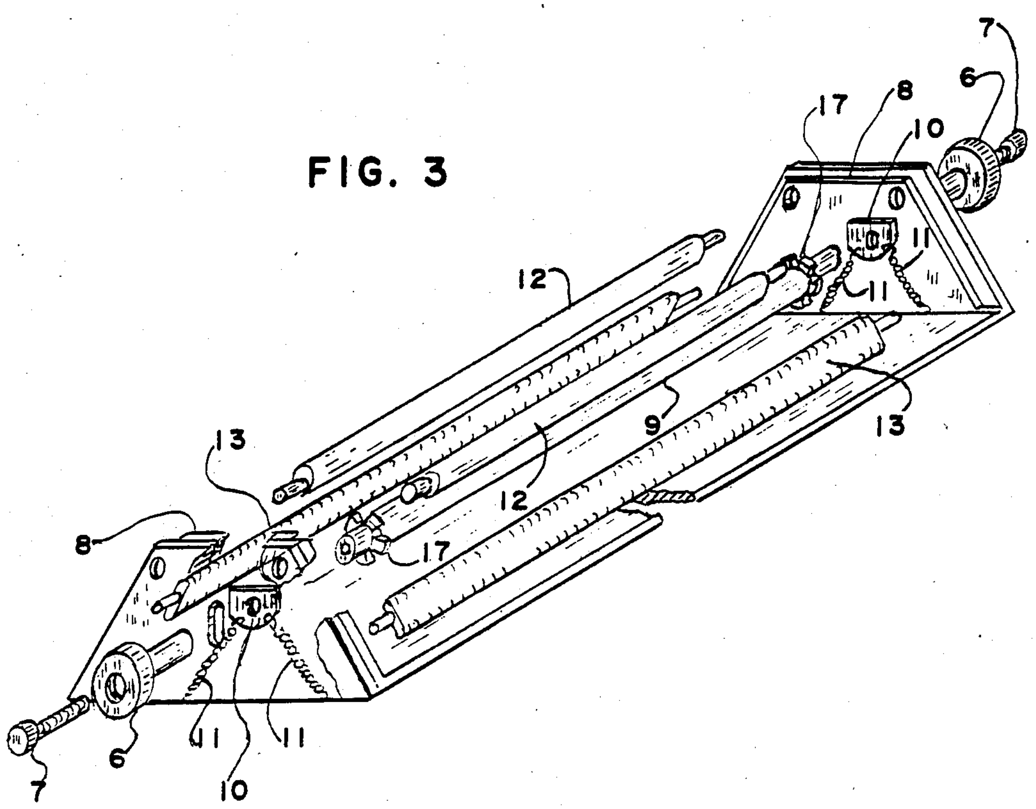
FIG. 3 is an isometric, cutaway view of the support end frame (8) and internal mechanism without the fabric sheet (14).

The internal operating mechanism is composed of the hard rubber drive platen (9), two cylindrical idler rollers (12), two molded and tapered guide platens (13), four drive platen tensioning springs (11), two drive platen positioning-tensioning plates (10) and two trapezoidal end frames (8), shown in FIG. 3. The idler rollers (12) and guide platens (13) carry and support the graduated fabric sheet (14). The drive platen tensioning springs (11) pull downward against the drive platen positioning-tensioning plates (10) which in turn balance the spring tension as applied to the drive platen (9). This tension is needed to assure a taut, wrinkle-free configuration for the graduated fabric sheet (14).

Figure 6:
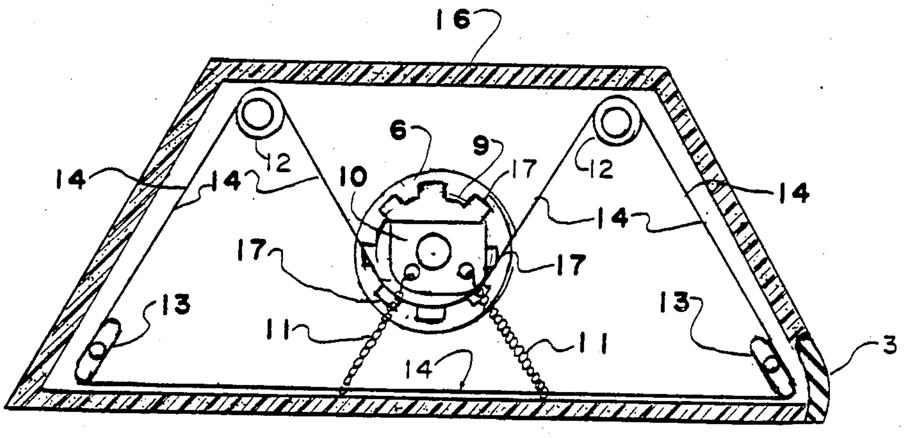
FIG. 6 is a typical end elevation showing the internal mechanism which supports and positions the drive platen (9) and graduated fabric sheet (14).
Figure 7:
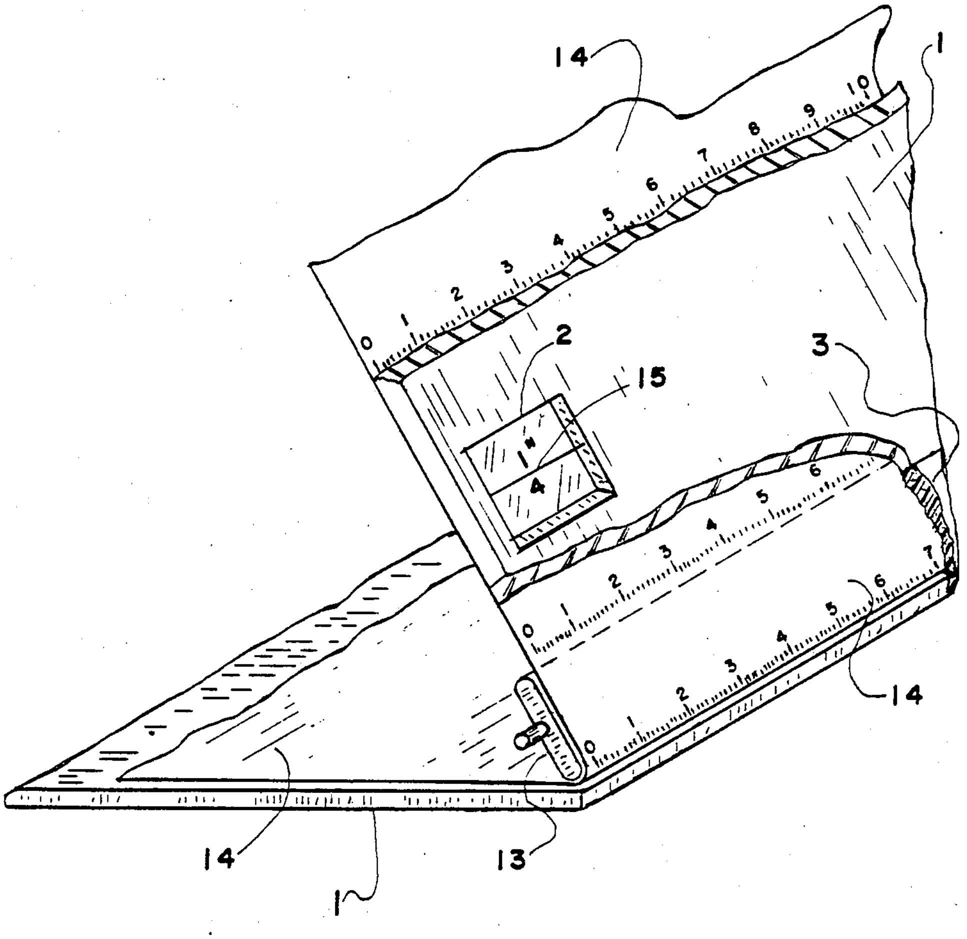
FIG. 7 is a detail view of the working edge showing the scale-type indicator window(2) including the indicator window cross hair (15), the guide platen (13) and the graduated fabric sheet(14).

The trapezoidal end frames (8) located directly inboard of the housing end plates (4) are provided with four corner holes. These holes accept the ends of the idler roller shafts (12) and guide platens (13), FIGS. 3 and 6. Thus, the end frames (8) serve to support the internal mechanism and hold it in a fixed position allowing free rotation of the two idler rollers (12) while holding the two guide platens (13) away from the housing (1). The upper idler rollers (12) are free to rotate and carry the graduated sheet (14). The two molded tapered guide platens (13) at the lower edges adjacent to the working surface do not rotate, but merely serve to position the graduated sheet (14) to a fixed distance to 0.02 inches from the plastic viewing window (3) at the working corner of the instrument. The end frames (8) are held in position between the body of the housing (1) and the housing end plates (4) by the compression and friction fit provided by the scale adjustment knob (6) which is caused to bear upon the housing end plate (4) on the slotted hole bearing surface (5). Two springs (11), FIG. 3, provide a downward pull on the drive platen (9) to assure constant tension on the graduated fabric sheet (14). These springs are anchored at the lower edges of the end frames (8). The upper ends of these springs (11) attach to the drive platen positioning-tensioning plate (10) which serves to balance and distribute the spring force to the shaft of the drive platen (9).

In order to assure the positive, constant rotation of the graduated fabric sheet (14) while furnishing a high level of control, platen drive sprocket gears (17) of acetal type plastic are fitted by an adhesive to the ends of the drive platen (9) cylinder and engage punched holes in the edges of the graduated fabric sheet (14).

The invention claimed is:

1. Graduated engineer/architect rule, rotationally mounted within a housing comprising:
- a graduated fabric sheet carried on platen guides and rollers; rotated by a drive platen mounted in said housing,
- a graduated fabric sheet advancement means, centrally mounted within the housing, supported by spring tensioned plates which accommodate the ends of the drive platen axis, spans the length of the housing passes through the end frame plates and has sprocket gears to engage said sheet,
- end frame assembly and support means fitted to housing ends to retain and permit rotation of platen and idler rollers, and to facilitate replacement of fabric sheets and allow fabric sheet tensioning,
- graduated fabric sheet tensioning means by platen tensioning plates mounted on the inboard ends of the said drive platen, tensioned by springs anchored to end frames,
- a full length scale viewing means providing low magnification and mounted to the working end of the front surface of the housing,
- means of scale-type selection/configuration using a viewing window and cross hair fitted into the left end of the front surface of said housing and centered vertically along that surface,
- end plate retention means using scale adjustment knobs fitted to the outboard ends of said drive platen and retained by screws which axially advance along said drive platen, resulting in compression between said scale adjustment knob and the outer bearing surfaces of the end plates such that the scale adjustment knobs can also serve to permit rotation of the drive platen, and
- a graduated fabric sheet guidance means using two molded tapered guide platens held by the end frames at the lower inside edges of the housing adjacent to the working surfaces to precisely position the graduated fabric sheet at the viewing window.

2. Graduated engineer/architect rule as in claim 1, said means to interchange the graduated fabric sheets through removal of the end plates to provide direct metric conversion by displaying the metric scale at the viewing window, when the corresponding English conversion ratio is placed in the scale-type indicating window, or installation of other special scales as required, and
- technical reference data display means printed on the flat top surface of said housing.

* * * * *